United States Patent [19]

Gokcen et al.

[11] Patent Number: 4,510,115
[45] Date of Patent: Apr. 9, 1985

[54] METHOD FOR FORMING LAYERED THERMOPLASTIC ARTICLES

[75] Inventors: Cem Gokcen, Norwich, England; Robert J. Williams, Chicago, Ill.

[73] Assignee: Baxter Travenol Laboratories, Inc., Deerfield, Ill.

[21] Appl. No.: 438,813

[22] Filed: Nov. 3, 1982

[51] Int. Cl.³ .............................................. B29C 17/07
[52] U.S. Cl. .................................... 264/515; 264/524; 264/525; 425/523; 425/524
[58] Field of Search ................. 264/515, 525; 425/523, 425/524; 215/232

[56] References Cited

U.S. PATENT DOCUMENTS

| | | | |
|---|---|---|---|
| 3,023,461 | 3/1962 | Sherman | 264/540 X |
| 3,082,484 | 3/1963 | Sherman | |
| 3,325,860 | 6/1967 | Hansen | |
| 3,409,710 | 11/1968 | Klygis | |
| 3,457,337 | 7/1969 | Turner | |
| 3,535,409 | 10/1970 | Rohde | |
| 3,655,084 | 4/1972 | Willhaus et al. | 215/1 C X |
| 3,792,144 | 2/1974 | Burkett et al. | 264/540 X |
| 3,817,417 | 6/1974 | Edwards | 215/316 X |
| 3,851,029 | 11/1974 | Cornett | |
| 3,919,374 | 11/1975 | Komendowski | |
| 4,079,850 | 3/1978 | Suzuki et al. | |
| 4,131,211 | 12/1978 | Corbic | 215/305 X |
| 4,176,153 | 11/1979 | Weiler | |
| 4,217,161 | 12/1980 | Yamada et al. | |
| 4,239,726 | 12/1980 | Weiler | |
| 4,265,693 | 5/1981 | Nishimoto et al. | |

Primary Examiner—Jan Silbaugh
Attorney, Agent, or Firm—Paul C. Flattery; Thomas Kmiotek; Daniel D. Ryan

[57] ABSTRACT

Layered thermoplastic articles and a method for forming layered thermoplastic articles are provided. The method involves forming a layered, thermoplastic parison, followed by blow molding the parison in a mold cavity to form a desired configuration of hollow article. The blow molded articles can be of any configuration achievable with known blow molding technology. Every section of the article can be layered, or the article can have selectively intermittent layered sections. The containers typically are used for storing and dispensing liquids and are of one-piece construction. In accordance with this invention, the thermoplastic materials are of a type which are incompatible.

7 Claims, 25 Drawing Figures

METHOD FOR FORMING LAYERED THERMOPLASTIC ARTICLES

FIELD OF THE INVENTION

This invention relates generally to blow molding and it particularly relates to-blow molding of novel, layered, hollow thermoplastic containers. The method involves initially forming a layered thermoplastic parison, followed by blow molding the parison in a mold cavity to form the desired configuration of hollow article. The blow molded articles can be of any configuration achievable with known blow molding technology. Every section of the article can be layered, or the article can have selectively intermittent layered sections. The containers typically are used for storing and dispensing liquids and are of one piece construction.

BACKGROUND OF THE INVENTION

Hollow, blow molded, thermoplastic articles enjoy widespread commercial acceptance because of ease of fabrication and reduced labor costs. Abundant applications for blow molded, thermoplastic articles are apparent in the medical field alone. Form, fill, and seal blow molded containers, designed for sterile and aseptic packaging of parenteral solutions and the like, are well known.

In certain applications, however, additional operations need to be performed on blow molded containers to decrease their water vapor permeability, decrease their permeability to gasses (especially oxygen), or provide a sterile surface on at least a portion of the outside of the container as may be desirable, particularly in the medical field. Additional layers of thermoplastic or adhesive material may be applied to blow molded containers in subsequent operations, after the article has been blown, in efforts to decrease permeability or provide a sterile surface. Subsequent operations, though, tend to be time consuming and labor intensive, thus increasing the cost of the completed article. Further still, when sterility is a factor, it is difficult to maintain acceptable control.

Heretofore, thermoplastic containers have had additional layers applied by methods such as dip coating, spray coating, shrink fit coating, or injection overmolding. See, for example, U.S. Pat. No. 3,457,337, *Method for Producing Coated Containers*, to Turner. Where gas permeability or water vapor permeability is important, outer layers of plastic material may be applied. Where medical uses are contemplated, the exterior of blow molded, thermoplastic containers can be sterilized by overcoating of the outer surface under sterile conditions or before terminal sterilization.

Plastic containers are often blow molded from a continuously extruded tube. Methods of coextrusion exist which comprise simultaneously extruding coaxial tubular members and then blow molding those members. Layered plastic containers are produced thereby, specifically to decrease gas or water vapor permeability of the container. See, for example, U.S. Pat. No. 4,079,850, *Multi-Layer Blow Molded Container and Process for Preparation Thereof*, to Suzuki, et al. and U.S. Pat. No. 3,457,337, *Method for Producing Coated Containers*, to Turner. Typically, though, the container layers are not easily separable or peelable because the thermoplastic materials used have been compatible, that is, they adhere at their interface.

By this invention layered, blow molded thermoplastic containers are produced by simultaneously feeding two thermoplastic materials, using existing injection or extrusion technology, into a blow molding die, extruding the simultaneously fed thermoplastic materials to form a layered parison, and then blow molding the parison.

As an additional feature, blow molded articles are provided which have the advantages of layered sealing systems without the need to provide subsequent, separate operations.

Another additional feature of the present invention is found in the flexibility afforded in locating layered sections. This invention provides a novel method of simultaneously feeding incompatible thermoplastic materials into a blow molding die to produce an optionally intermittently layered parison which is blow molded into an intermittently layered article.

Still another advantage of the present invention lies in the ability to produce a blow molded thermoplastic article with a peelable thermoplastic layer thereover, which is simultaneously blow molded with the article, and which maintains a sterile interface until removed.

Further features of the invention include providing containers with reduced gas permeability or water vapor permeability by blow molding layered, thermoplastic containers.

BRIEF SUMMARY OF THE INVENTION

The present invention provides a method of forming layered, hollow thermoplastic articles. The method involves controlled simultaneous feeding of at least two thermoplastic materials into a blow molding die and thereafter extruding the simultaneously fed thermoplastic materials from the blow molding die to form a layered, thermoplastic parison. Blow molding of the parison in a mold cavity follows, with the result being a hollow article of desired configuration. In accordance with this invention, the thermoplastic materials are of a type which are incompatible. The term incompatible is broadly used to designate thermoplastic materials exhibiting an adhesion bond between the materials which is weak enough to allow separation or peeling of the layers. Incompatible materials are defined as having a bond strength of 6.7 pounds per square inch or less as determined by ASTM Designation: D 952-51 (Reapproved 1961).

Simultaneous feeding of one or more of the thermoplastic materials into the blow molding die can be intermittent with a resulting extruded parison and completed article that is intermittently layered. Normal die programming means can precisely control the position and thickness of the layers of the parison and, hence, the position and thickness of layers on the completed articles. A large variety of articles unique to blow molding may be produced by the method of this invention.

By appropriate selection of incompatible thermoplastic materials, articles having removable or peelable outer layers may be obtained. The ease with which outer layers are removable depends, of course, upon the selection of thermoplastic materials. In addition to easily peelable outer layers, injection sites on medical containers made from thermoplastic elastomers may be made in accordance with this invention. In addition, feeding temperatures of at least about 350° F. for the fed, extruded thermoplastic materials can be used to produce a sterilized interface between layers on the blow molded article.

The blow molded articles of the present invention may be filled with a sterile fluid, for example, water, saline solution, or one of a myriad of other fluids. The filling and sealing of such containers may be done in accordance with known blow molding technology.

Other aims and advantages of this invention will become apparent upon reading the following detailed description and appended claims.

BRIEF DESCRIPTION OF THE DRAWINGS

For a more complete understanding of this invention, reference should now be had to the embodiments illustrated in greater detail in the accompanying drawings.

In the drawings.

DESCRIPTION OF THE PREFERRED EMBODIMENTS

Figure 6:
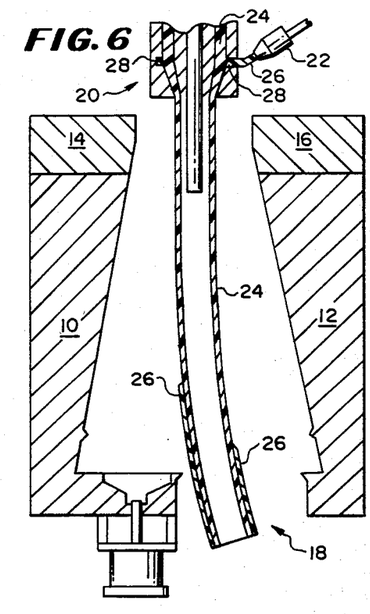
FIG. 6 is a cross section of a mold cavity accepting a layered parison for blow molding thereof.

Turning now to the drawings, FIG. 6 shows two mold cavity sections 10, 12 in their open position. Slide clamps 14, 16 rest on top of mold cavity sections 10, 12. A layered parison 18, extruded from blow molding die 20 is between mold cavity sections 10, 12. Nozzle 22 is shown connected to blow molding die 20.

Parison 18 is formed by extruding thermoplastic material from blow molding die 20. By conventional die programming means, using existing injection or extrusion technology and including reciprocating screw means, a first thermoplastic material 24 is fed (in its molten state) into blow molding die 20. The molten plastic 24 fed into blow molding die 20 is preferably at least at a temperature of about 350° F. Nozzle 22 is shown feeding molten second thermoplastic material 26, incompatible with first thermoplastic material 24, into blow molding die 20. Conventional die programming means, including reciprocating screw means control the feed rate. Typically, second thermoplastic material 26 is also at a temperature of at least 350° F. First thermoplastic material 24 and second thermoplastic material 26 are incompatible materials.

It should be appreciated that the thickness of first thermoplastic material 24 and second thermoplastic material 26 are controlled by their relative feed rates using the normal die programming means. Purely for ease of illustration, the layers of thermoplastic materials are shown roughly of the same thickness in all the figures. Thickness of the layers of thermoplastic material can typically range from 0.001 to 0.2 inch or more.

Second thermoplastic material 26 feeds into reservoir 28 located inside blow molding die 20. In this embodiment of the invention, reservoir 28 is annular. Changes in configuration of reservoir 28 from its annular shape to portions of an arc of an annulus result in the depositing of strips of the second thermoplastic material onto the first thermoplastic material.

By intermittently feeding second thermoplastic material 26 into blow molding die 20, an intermittent layer of second thermoplastic material 26 is deposited onto first thermoplastic material 24. Extruding the simultaneously fed thermoplastic materials from blow molding die 20 forms an intermittently layered thermoplastic parison 18.

Figure 7:
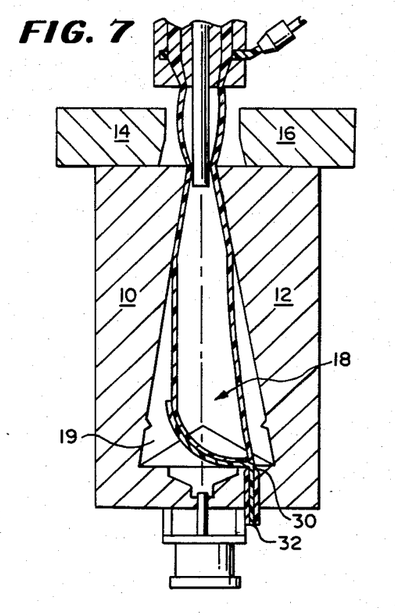
FIG. 7 is a cross section of the mold cavity of FIG. 6 in a closed position before blowing.

In FIG. 7, mold cavity sections 10, 12 have been closed, simultaneously closing off one end of thermoplastic parison 18 and forming mold cavity 19. A frangible section 30 is formed at the closed end of parison 18 when mold cavity sections 10, 12 are closed. Extending tab 32 is also formed.

Figure 8:
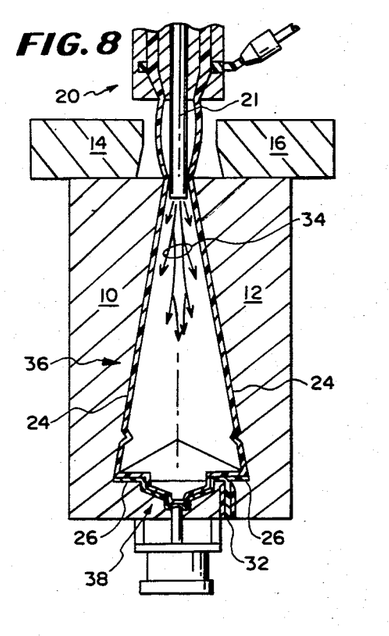
FIG. 8 is a cross section of the mold cavity of FIG. 6 showing blowing of the parison.

Blow molding of parison 18 is illustrated in FIG. 8, where ambient air 34 is blown into the closed off parison. At this stage, container bag 36 begins to take shape. Container bag 36 is comprised of first thermoplastic material 24. An outer layer comprised of second thermoplastic material 26 is shown covering bottom end 38 of container bag 36.

Figure 9:
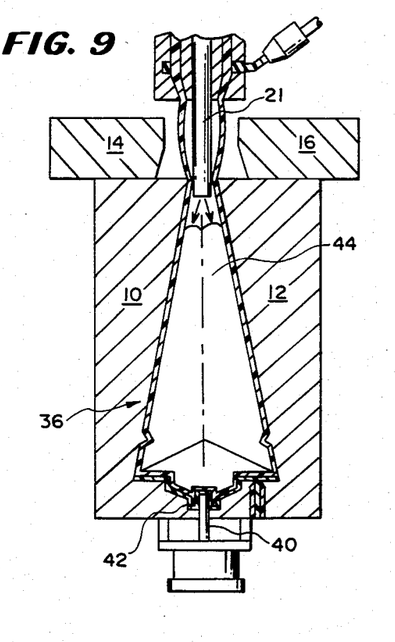
FIG. 9 is a cross section of the mold cavity of FIG. 6 illustrating the filling of a blown container bag and formation of an access port.

FIG. 9 shows container bag 36 after pin 40 has been used to form access port 42 on container bag 36. Filling with desired liquid 44 is accomplished through fill/blow tube 21.

Figure 10:
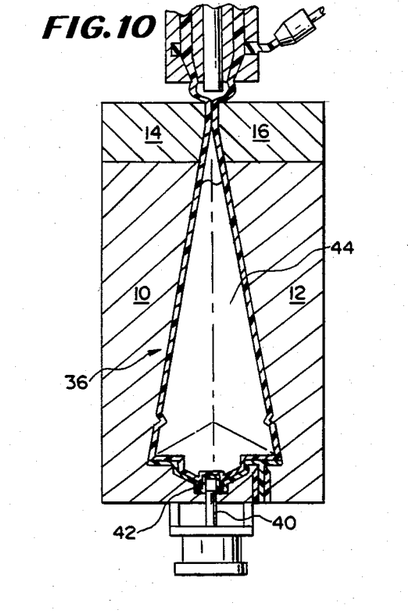
FIG. 10 is a cross section of the mold cavity of FIG. 6 showing the mold cavity containing the filled blow molded article being sealed closed.

After container bag 36 has been completely filled with fluid contents 44, slide clamps 14, 16 are closed, as is shown in FIG. 10, to seal closed container bag 36. At the same time, pin 40 is retracted completing the formation of access port 42.

Figure 11:
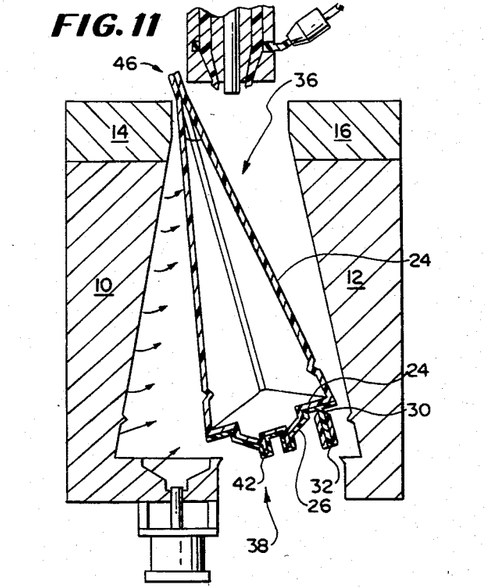
FIG. 11 is a cross section of the mold cavity of FIG. 6 showing the formed, filled, and sealed article being removed from the mold cavity.

FIG. 11 shows a sealed container bag 36. Container bag 36 is then removed from between open mold cavity sections 10, 12.

Figure 12:
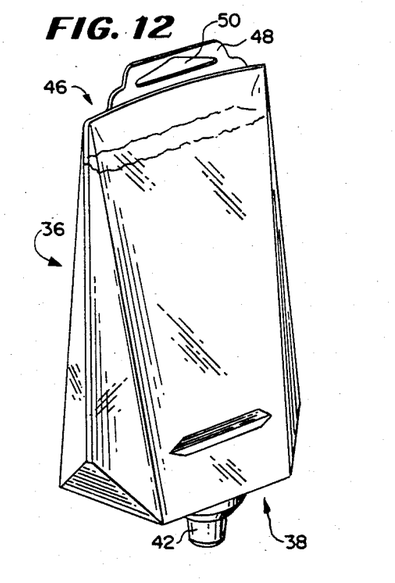
FIG. 12 is a perspective view of a medical fluid container bag manufactured in accordance with the method of this invention.

Completed container bag 36 is shown in FIGS. 11 and 12. Top end 46 has an extending tab 48 having opening 50. Bottom end 38 of container bag 36 is shown covered by second thermoplastic material 26. Access port 42 is also covered by second thermoplastic material 26. Tab 32, having frangible section 30, depends from bottom end 38 of container bag 36.

The container bag 36 formed by the method of this invention has integrally formed access port 42 covered by second thermoplastic material 26. Because of the high temperatures encountered during the feeding and extruding steps in the method of this invention, the interface between thermoplastic materials 24 and 26 is essentially sterile. Since the thermoplastic materials used are incompatible, thermoplastic material 26 may be peeled off the bottom end 38 and access port 42 of container bag 36 just prior to use, thereby offering a sterile surface.

Preferred incompatible thermoplastics 24, of which the container bag 36 is made, include polyolefins such as polypropylene, copolymers having a high polypropylene content, and polyethylene. Polycarbonates may also be used. Preferred incompatible thermoplastic materials for second thermoplastic material 26 which constitutes the outer, peelable layer, include polystyrene, ABS, polyvinylchloride, and fluoropolymers such as polyvinylidene fluoride. Styrene containing thermoplastic elastomers may also be compounded to be incompatible with the thermoplastic material of the container and thus usable.

Figures 23, 24, 25:
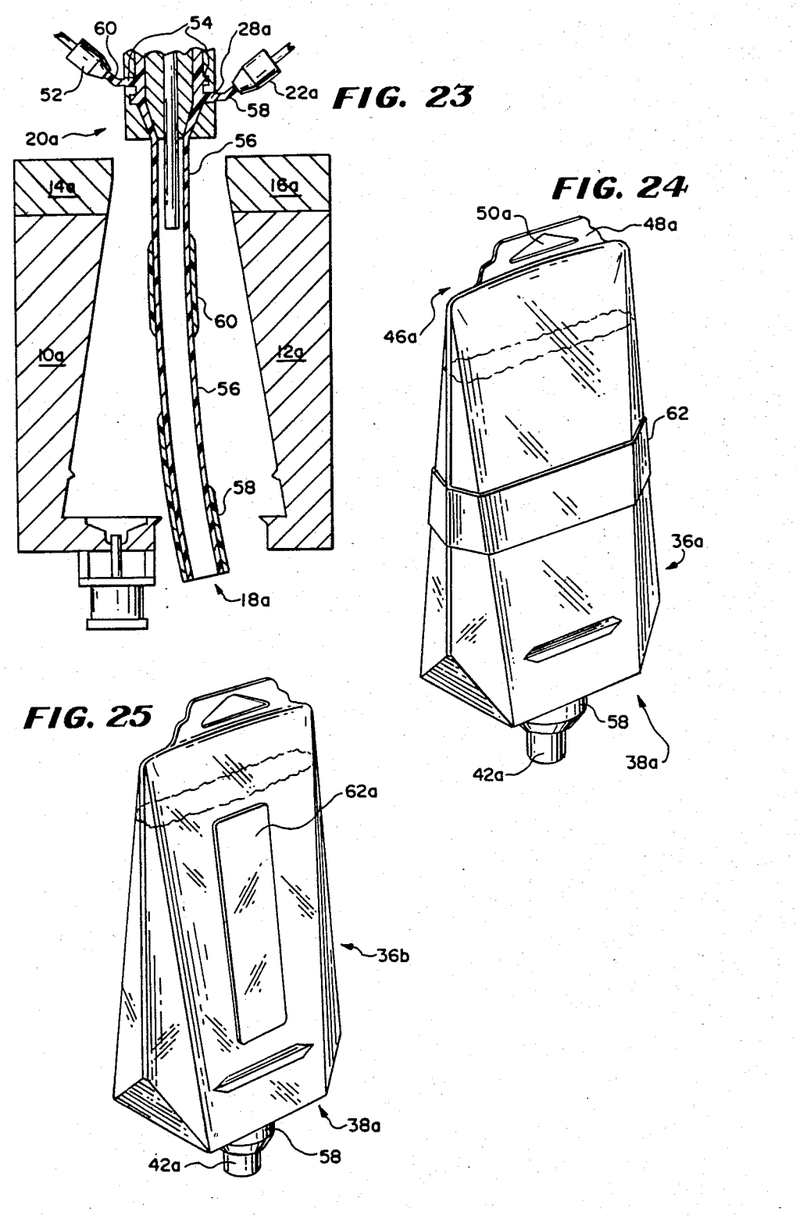
FIG. 23 is a cross section of a mold cavity accepting a parison having several layered sections.
FIG. 24 is a perspective of a container bag formed from the parison shown in FIG. 23.
FIG. 25 is an alternative construction of the blow molded container bag of FIG. 24.

Turning now to FIG. 23, an alternative embodiment is shown. This embodiment is substantially the same as the embodiment illustrated in FIGS. 6 through 12 except as otherwise described herein. Mold cavity sections 10a, 12a are shown having slide clamps 14a, 16a resting thereon. Parison 18a is shown between mold cavity sections 10a, 12a.

Nozzle 22a is shown connected to blow molding die 20a. A second Nozzle 52 is also shown connected to blow molding die 20a. Nozzle 22a feeds into annular reservoir 28a located in blow molding die 20a. Nozzle 52 feeds into reservoir 54 located in blow molding die 20a. Reservoir 54 may be completely annular, or it may be only a portion of an arc of an annulus.

In this embodiment, three thermoplastic materials have been fed into blow molding die 20a. Feeding of first thermoplastic material 56 is continuous while simultaneous feeding of second thermoplastic material 58 and third thermoplastic material 60 are intermittent. Parison 18a is comprised of first thermoplastic material 56 covered in sections by second thermoplastic material 58 and third thermoplastic material 60.

The article blow molded from parison 18a of FIG. 23 is shown in FIG. 24. Container bag 36a is shown having extending tab 48a having opening 50a at top end 46a. Access port 42a is shown in bottom end 38a of container bag 36a. Thermoplastic material 60 (FIG. 23) made for example of Kraton G (a trademarked plastic manufactured by Shell Oil Company) thermoplastic rubber, forms injection strip 62 on the container bag. Similarly, other known elastomeric materials, for example EVA, may also be used to form injection strips. Injection strip 62 can be used as a sterile injection site for injecting an additive, such as a medicament, into container bag 36a. Access port 42a and bottom end 38a are provided with a peelable layer formed from thermoplastic material 58.

FIG. 25 shows an alternative configuration of the container bag shown in FIG. 24. Container bag 36b is shown with an injection strip 62a formed by feeding third thermoplastic material 60 into a reservoir that is only a portion of an arc of an annulus. Injection strip 62a may be used as a sterile injection site for injecting an additive into container bag 36b. Bottom end 38a and administration site 42a are protected by a peelable layer formed from thermoplastic material 58.

Figure 1:
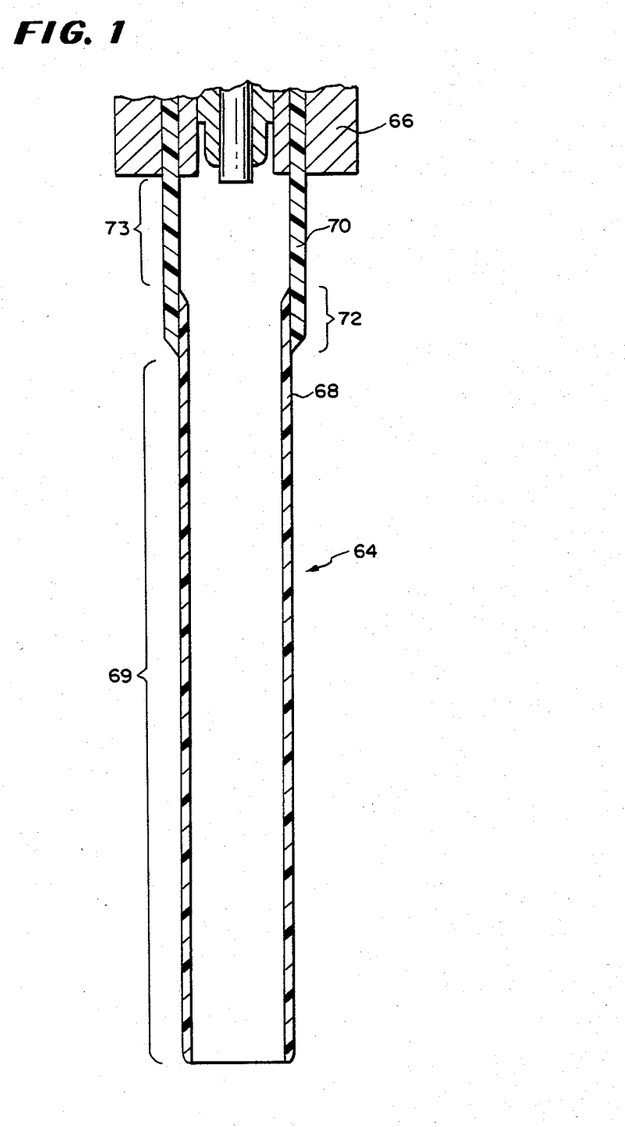
FIG. 1 is a cross section of an intermittently layered parison in the process of being extruded from a blow molding die.

Turning now to FIG. 1, layered parison 64 is shown. Only a portion of blow molding die 66 is shown. However, parison 64 is formed in a manner similar to the method previously described herein.

Parison 64 is formed by feeding first thermoplastic material 68 into blow molding die 66 and extruding first thermoplastic material 68. Second thermoplastic material 70 is simultaneously fed into blow molding die 66 and the simultaneously fed thermoplastic materials 66 and 68 are extruded from blow molding die 66 forming layered portion 72 of thermoplastic parison 64. Thereafter, feeding of first thermoplastic material 68 is terminated with the feeding of second thermoplastic material 70 continuing. Parison 64 is the result of this intermittent simultaneous feeding. In parison 64, first section 69 is free of an overlying layer. Second section 72 has an overlying layer, and third section 73 is free of an underlying layer.

Parison 64 is typically introduced between two mold cavity sections which are subsequently closed to form a mold cavity. Blowing of the parison then proceeds, followed by filling of the blown article, still in a mold cavity.

Figure 2:
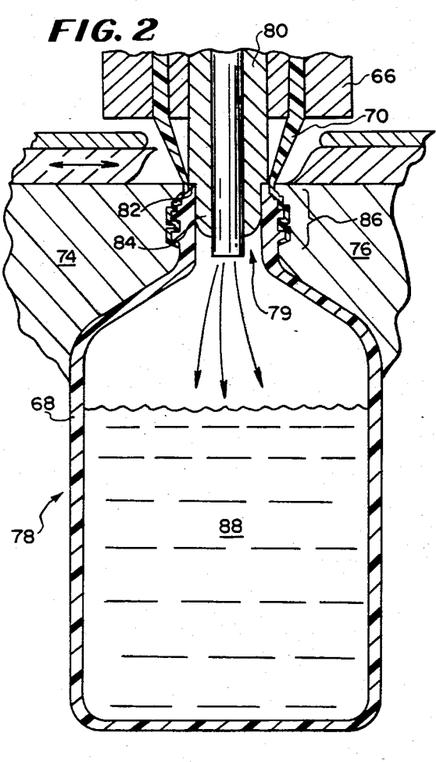
FIG. 2 is a cross section of a blow molded article in a mold cavity being filled after blowing.

FIG. 2 shows mold cavity sections 74, 76 in their closed position after parison 64 has been blown, to form container 78 having outlet 79. Container 78 is comprised of first thermoplastic material 68, such as polypropylene. Fill/blow plug 80, within blow molding die 66, is shown projecting therefrom into the mold cavity formed by mold cavity section 74, 76. Shoulder 82 on end portion 84 of fill/blow plug 80 forms neck portion 86 of container 68. Container 78 is shown being filled with any suitable fluid 88. Second thermoplastic material 70 constitutes an outer layer such as polyvinyl chloride on neck 86 of container 78.

Figure 3:
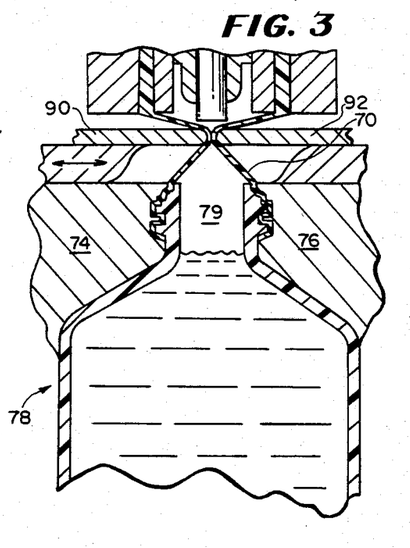
FIG. 3 is a cross section showing the filled article of FIG. 2 as sealing begins.
Figure 4:
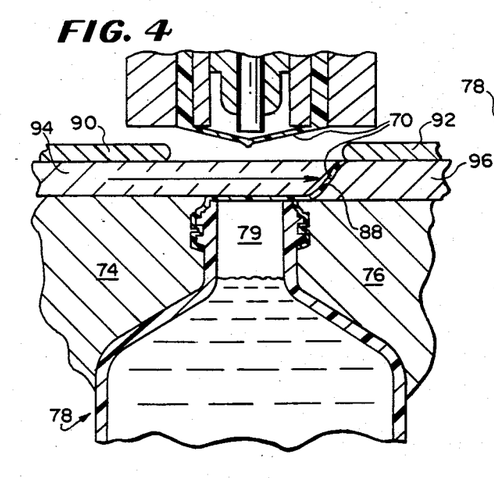
FIG. 4 is a cross section of the blow molded article of FIG. 2 showing the completed seal.

Slide plates 90, 92 of FIG. 3 are shown pinching off second thermoplastic material 70 after container 78 has been completely filled. FIG. 4 shows the final step in sealing container 78. Slide plates 90, 92 are opened after sealing slide plate 94 severs second thermoplastic material 70 sealing container 78 at outlet 79 and engaging sealing plate 96 to form tab 98.

Figure 5:
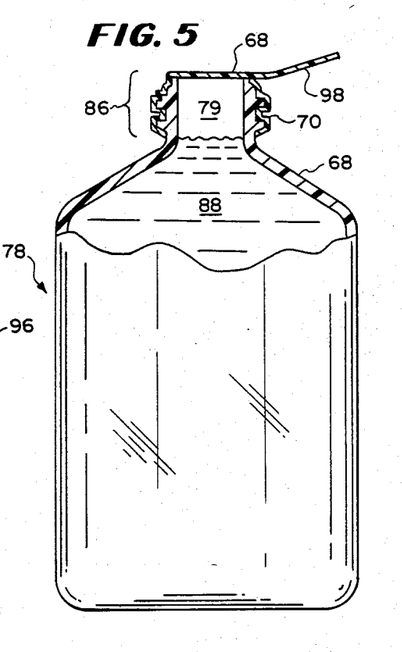
FIG. 5 is a front elevational view in partial cross section showing the formed, filled, and sealed container.

FIG. 5 shows closed container 78 filled with a suitable fluid 88. Container 78 is comprised of first thermoplastic material 68 which is covered by a layer of second thermoplastic material 70 at neck 86. Second thermoplastic material 70 also seals outlet 79 of container 78 and terminates in tab 98. Thus material 70 serves as a tear-off cap which provides a sterile seal until torn off.

Figure 13:
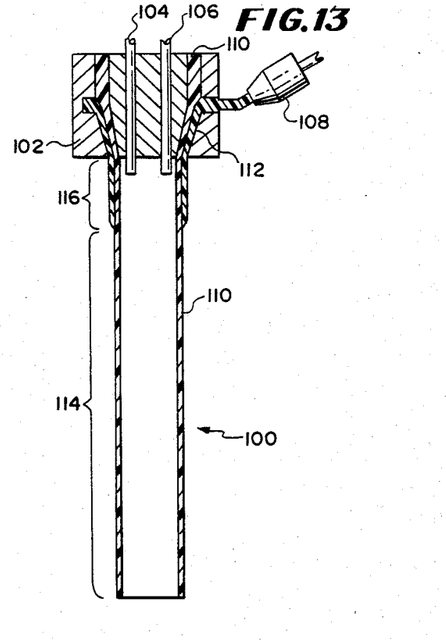
FIG. 13 is a cross section of a blow molding die extruding an intermittently layered parison.

Turning now to FIG. 13, another parison configuration is shown. Parison 100 is formed in accordance with the method of this invention. Blow molding die 102 is shown extruding parison 100. Fill/blow tubes 104, 106 are located within blow molding die 102. Nozzle 108 is also shown.

In accordance with the method of this invention, first thermoplastic material 110 is continuously fed into blow molding die 102. Second thermoplastic material 112 is thereafter simultaneously fed into blow molding die 102 through nozzle 108.

By intermittent simultaneous feeding of second thermoplastic material 112 into blow molding die 102 and extrusion of the thermoplastic materials from blow molding die 102, layered thermoplastic parison 100 is formed. Intermittent feeding of thermoplastic material 112 forms a parison having first section 114 free of an overlying layer of thermoplastic material and a second section 116 having an overlying layer of thermoplastic material 112.

Figure 14:
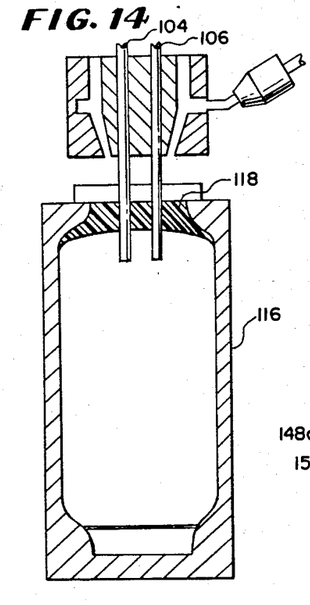
FIG. 14 is a cross section of a container bag formed in accordance with the method of this invention by blow molding the parison of FIG. 13.
Figure 15:
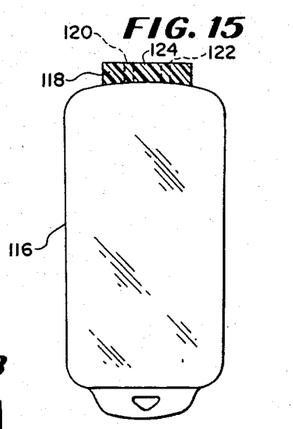
FIG. 15 is an elevational view of the container bag of FIG. 14 showing a peelable end layer covering access ports.

FIG. 14 illustrates container bag 116 formed by the method of the present invention after blowing and filling through fill/blow tubes 104, 106. Container bag 116 has peelable layer 118 comprised of second thermoplastic material 112 and covering the access port area formed by fill/blow tubes 104, 106. FIG. 15 illustrates container bag 116 after end 124 has been sealed. Access ports 120, 122 are closed by known, conventional means. Peelable outer layer 118 acts as a sterile barrier insuring the sterility of access ports 120, 122 until peelable strip 118 is removed.

Figure 20:
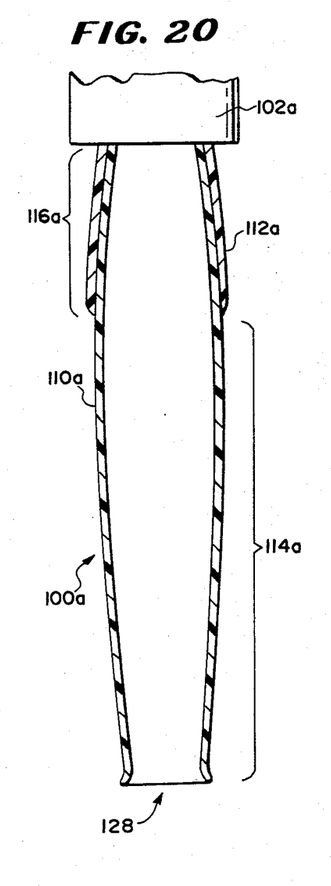
FIG. 20 is a cross section of an intermittently layered parison extruded from the blow molding die.

FIG. 20 illustrates parison 100a, substantially similar to the parison illustrated in FIG. 13. Parison 100a is formed by continuously feeding first thermoplastic material 110a into blow molding die 102a and intermittently feeding second thermoplastic material 112a into blow molding die 102a. When the thermoplastic materials are extruded from blow molding die 102a, layered, thermoplastic parison 100a is formed. First section 114a of parison 100a is free of an overlying layer and second section 116a of parison 100a has an overlying layer of thermoplastic material 112a. End 128 of parison 100a is closed off in a conventional mold cavity.

Figure 21:
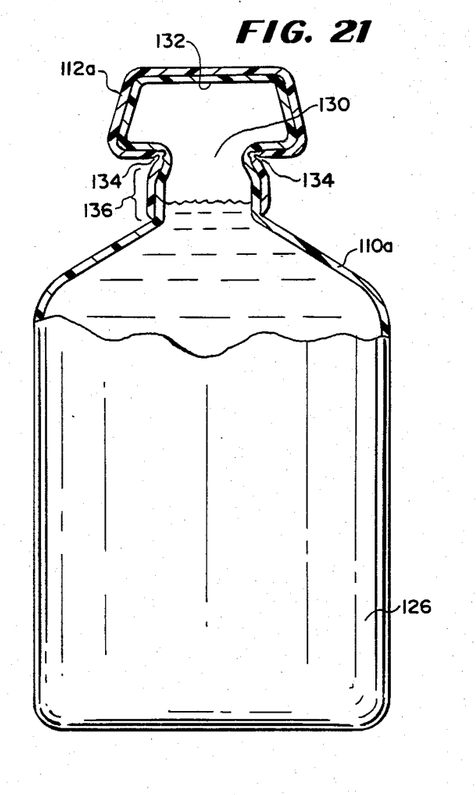
FIG. 21 is a front elevational view, in partial section, showing a container having a cap attached to the container neck at a frangible section, blown from the parison of FIG. 20.

The parison is blow molded in the mold cavity to form container 126, which is thereafter filled and sealed by closing cap 132 over container outlet 130. Frangible section 134 couples cap 132 to neck 136 of container 126.

Container 126 and cap 132 are comprised of first thermoplastic material 110a. A portion of neck 136 and cap 132 are covered by an overlying layer of incompatible second thermoplastic material 112a. In this manner, the interface between overlying layer comprised of second thermoplastic material 112a and container 126, comprised of thermoplastic material 110a, remains sterile until the overlying layer is removed by breaking frangible groove 134 to remove cap 132.

Figure 22:
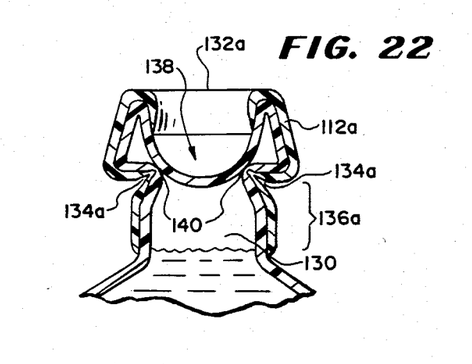
FIG. 22 is a cross section of the neck portion and cap of the container of FIG. 21 showing an alternative configuration for the cap.

FIG. 22 shows an alternative configuration of the cap for the container illustrated in FIG. 21. Thermoplastic material 112a overlies a portion of neck 136a and cap 132a. Cap 132a has a concave indentation 138 which forms frangible connection 140 at container outlet 130 in addition to frangible groove 134a.

Figure 16:
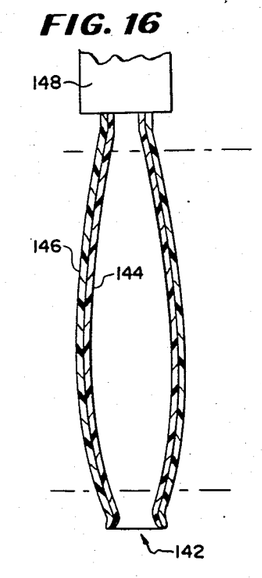
FIG. 16 is a cross section of a two-layered parison extruded from a blow molding die.
Figure 18:
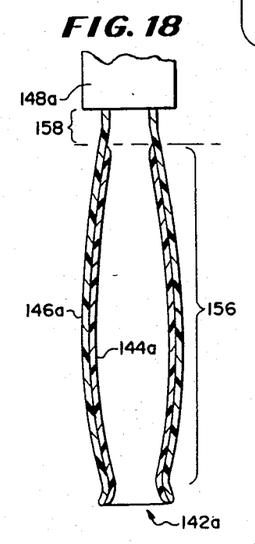
FIG. 18 is a cross section of an intermittently layered parison extruded from a blow molding die.

Additional alternative embodiments of parisons formed in accordance with the method of the present invention are seen in FIGS. 16 and 18. In FIG. 16, parison 142 is formed by continuously and simultaneously feeding first thermoplastic material 144 and second thermoplastic material 146 into blow molding die 148. The simultaneously fed thermoplastic materials are extruded from blow molding die 148 forming layered parison 142.

Figure 17:
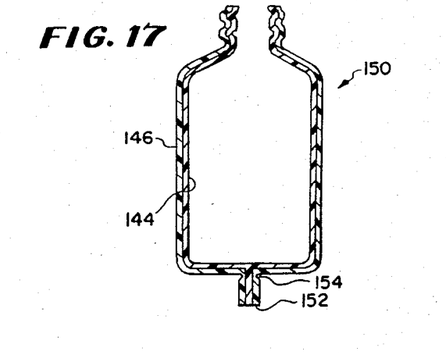
FIG. 17 is a cross section of a container blown from the parison of FIG. 16.

Upon blow molding parison 142 in a mold cavity, container 150 is formed. Container 150 is comprised of first thermoplastic material 144 having an overlying layer comprised of incompatible second thermoplastic material 146. The entire exterior of container 150 is covered by a layer of second thermoplastic material 146. Located at the bottom of container 150 is tab 152 connected to container 150 at frangible section 154, to permit removal of outer layer 146. Outer layer 146 can serve as a water vapor or oxygen barrier, or as an opaque protection against light, with inner layer 144 being transparent.

FIG. 18 depicts a parison 142a substantially similar to the parison depicted in FIG. 16 except as otherwise described herein. First thermoplastic material 144a and second thermoplastic material 146a are simultaneously fed into blow molding die 148a. Feeding of first thermoplastic material 144a is then stopped. When the thermoplastic materials are extruded from blow molding die 148a, an intermittently layered parison is formed. First section 156 has an underlying layer of thermoplastic material 144a, and second section 158 is free of an underlying layer.

Figure 19:
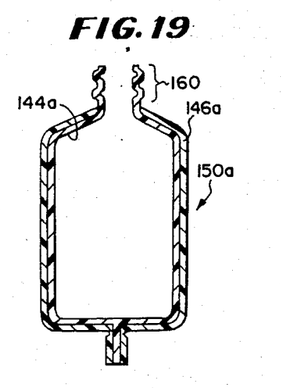
FIG. 19 is a cross section of a container blown from the parison of FIG. 18.

After blow molding parison 142a, container 150a is formed. Container 150a is comprised of first thermoplastic material 144a having a portion of its exterior covered by an overlying layer of second thermoplastic material 146a. Neck portion 160 of container 150a is free of an overlying layer of thermoplastic material.

Accordingly it can be seen that multiple layer blow molded containers of many different kinds can be made in accordance with this invention, frequently with the respective layers being made of incompatible materials so that one of the layers can be removed for any of various purposes, some of which are described herein. Also the layers can be permanently sealed together and can serve as vapor barriers or the like.

The above has been offered for illustrative purposes, and is not intended to limit the invention of this application, which is defined in the claims below.

What is claimed is:

1. A method of forming a hollow thermoplastic article comprising the steps of:

continuously feeding a first thermoplastic material into a blow molding die while intermittently, simultaneously feeding a second thermoplastic material into the blow molding die, the second material being incompatible with the first material;

extruding the first and second thermoplastic materials from the blow molding die to form a thermoplastic parison having a first section comprising a single layer of the first material and a second section comprising an inner layer of the first material and an overlying layer of the second material;

closing off the second section of the parison within a mold cavity to form a closed end wall comprising the inner first material layer covered by an overwrap formed by the overlying layer of the second material which, due to its incompatibility, can be selectively peeled away when desired to expose the inner first material layer without otherwise opening the end wall;

blow molding the closed off parison in the mold cavity to form the desired configuration of the hollow article comprising side walls formed from the first parison section and the closed end wall formed from the second parison section; and, forming in the closed end wall of the hollow article an access port which is normally covered by the peel-away overwrap and which, upon peeling away of the overwrap, is exposed for use.

2. The method of claim 1 wherein, during said step of feeding the temperatures at which the extruded thermoplastic materials are fed are at least 350° F., whereby the interface between the first and second materials in the second parison section is sterilized.

3. The method of claim 1 wherein one thermoplastic material is a polyolefin.

4. The method of claim 3 wherein the other thermoplastic material is a styrene unit-containing thermoplastic elastomer.

5. The method of claim 1 wherein the overlying layer of the second material is thinner than the inner layer of the first material.

6. The method of claim 1 wherein, during said step in which the second section of the parison is closed off, a portion of the second section is flattened by the mold cavity to form a tab which is attached to the overwrap and which, when pulled upon, facilitates the peeling away of the overwrap.

7. The method of claim 1 and further including the step of filling the blow molded hollow article with the desired contents from the end opposite to the closed end wall.

* * * * *